MAGNETIC AMPLIFIER CIRCUIT

Filed Dec. 15, 1954

INVENTOR
JOHN PRESPER ECKERT, JR.
BY
Eferry Light
ATTORNEY

United States Patent Office 2,854,586

Patented Sept. 30, 1958

2,854,586

MAGNETIC AMPLIFIER CIRCUIT

John Presper Eckert, Jr., Philadelphia, Pa., assignor, by mesne assignments, to Sperry Rand Corporation, New York, N. Y., a corporation of Delaware Application December 15, 1954, Serial No. 475,441

20 Claims. (Cl. 307—88)

The present invention relates to magnetic amplifier circuits and is more particularly concerned with improved circuits for use in both series and parallel type magnetic amplifiers, whereby the operation of such amplifiers may be made substantially independent of the magnitude of power pulses applied thereto.

Magnetic amplifiers have in the past been utilized in a number of circuit configurations. In general, these configurations have employed a core of magnetic material carrying one or more coils thereon. One of the said coils may be coupled to a source of positive and negative going power pulses, and in the operation of such a pulse-type device, the said power pulses have been of such magnitude that, in addition to selectively providing an output signal, they have also caused the said magnetic core to move selectively to non-output producing operating points. This operational feature of magnetic amplifiers has of necessity placed a minimum permissible value upon the magnitude of power pulse which could be utilized, and this minimum has in turn often imposed undesired and sometimes wasteful restrictions upon the type of power pulse source which could be employed.

The present invention serves to obviate the foregoing difficulties by providing a novel magnetic amplifier arrangement whereby pulse sources are so coupled to the said amplifier that proper operation is assured independent of the magnitude of power pulse utilized.

It is accordingly an object of the present invention to provide an improved magnetic amplifier circuit.

Another object of the present invention resides in the provision of improved magnetic amplifier circuits of both the series and parallel type.

Still another object of the present invention resides in the provision of magnetic amplifier circuits wherein the operation of the said amplifier is independent of the amplitude of power pulse applied thereto.

Another object of the present invention resides in the provision of a magnetic amplifier circuit in combination with external pulse sources whereby the effect of power pulses applied to the said amplifier circuit is supplemented by the said external pulses to effect proper operation of the said amplifier.

In accomplishing the foregoing objects and advantages, the magnetic amplifier of the present invention employs a core of magnetic material carrying plural windings thereon. One of the said windings may be coupled to a source of positive and negative going power pulses, the amplitude of which pulses need not be sufficient to cause the said core to traverse its hysteresis loop. A source of external pulses is also coupled to the said amplifier, preferably to a coil other than that supplied by power pulses, and the said external pulses are of such polarity and phase with respect to the said power pulses that the external pulses alone, or the external pulses in combination with the power pulses, cause the core to traverse its hysteresis loop. The concepts of the present invention may be applied to series type magnetic amplifiers, wherein the load is connected in series with the coil to which power pulses are applied. These concepts may also be applied to parallel type magnetic amplifiers wherein the load is connected in parallel to the coil to which power pulses are applied, or wherein the load is connected across a coil other than that to which the said power pulses are applied. In either case the external pulses are so coupled to the said amplifier that the amplifier circuit becomes independent of the power pulse for translation from an output-inhibiting operating point to an output-producing operating point of the core material utilized.

The foregoing objects, advantages, construction and operation of the present invention will be more readily seen from the following description and accompanying drawings, in which.

Figures 1, 2, 2A, 3, 4, 5:
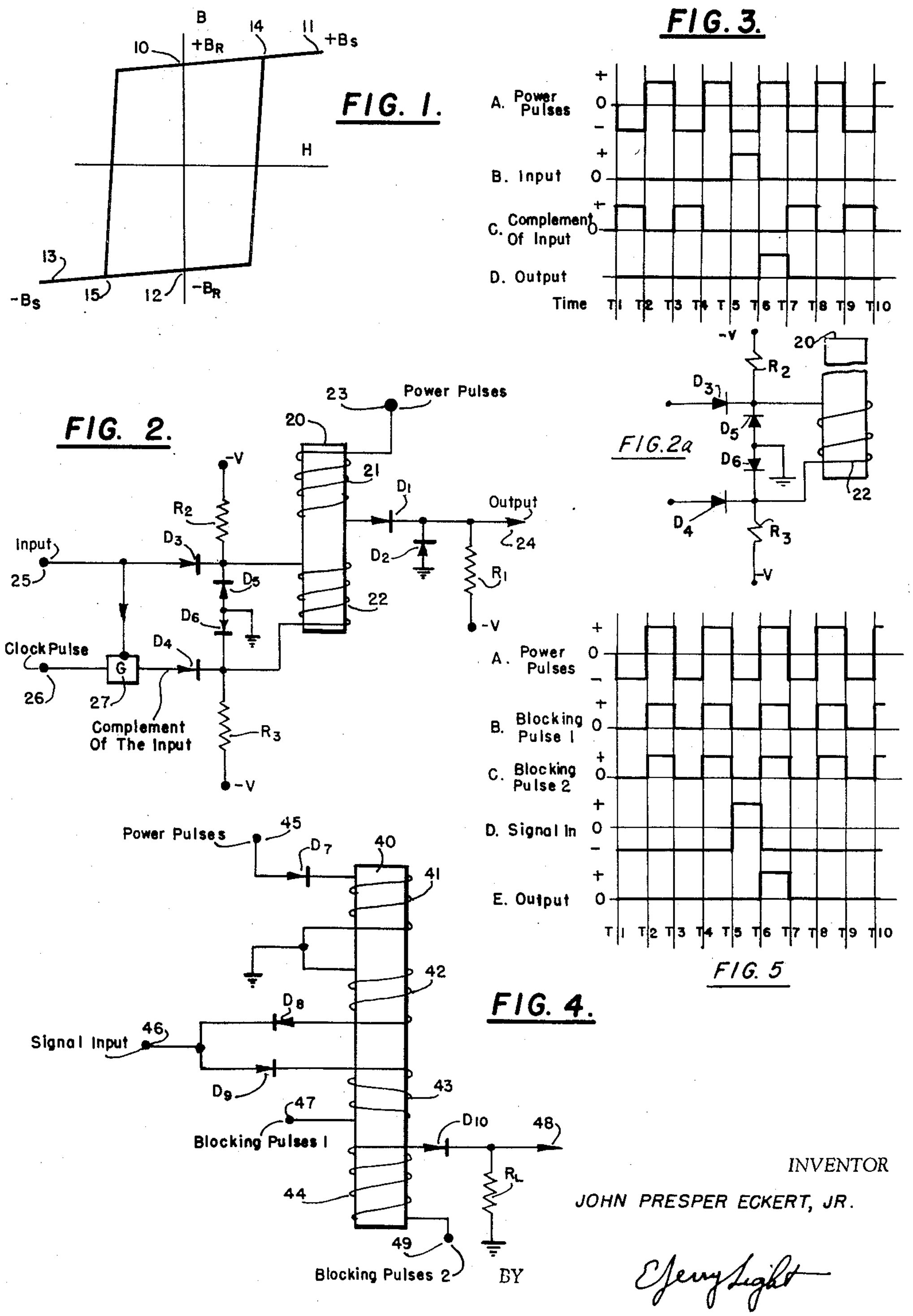
Figure 1 is an idealized hysteresis loop of a magnetic material which may preferably but not necessarily be employed in the cores of magnetic amplifiers in accordance with the present invention.
Figure 2 is a schematic diagram of a simple series type magnetic amplifier constructed in accordance with the present invention.

Figure 2*a* is a schematic diagram of a modification of the magnetic amplifier shown in Figure 2.

Figure 3 (A through D) are waveforms depicting the operation of the circuit shown in Figure 2;

Figure 4 is a schematic diagram of a simple parallel type magnetic amplifier constructed in accordance with the present invention; and Figure 5 (A through E) are waveforms depicting the operating of the parallel type amplifier shown in Figure 4.

Referring now to the hysteresis loop shown in Figure 1, it will be seen that magnetic amplifiers constructed in accordance with the present invention may preferably but not necessarily, utilize magnetic cores exhibiting a substantially rectangular hysteresis loop. Such cores may be made of a variety of materials, among which are the various types of ferrites, and various kinds of magnetic tapes, including Orthonik and 4–79 Molypermalloy. These materials may in turn be given different heat treatments to effect different desired properties. In addition to the wide variety of materials applicable, the cores of the magnetic amplifiers to be discussed may be constructed in a number of different geometries including both closed and open paths. For example, cup-shaped cores, strips of material, or toroidal cores may be utilized. It must be emphasized however that the present invention is not limited to any specific geometries of its cores nor to any specific hysteretic configuration therefor, and the examples to be given are illustrative only.

Returning to the hysteresis loop shown in Figure 1, it will be noted that the curve exhibits several significant points of operation, namely, point 10 ($+B_r$) which represents a point of plus remanence; the point 11 ($+B_s$) which represents plus saturation; the point 12 ($-B_r$) which represents minus remanence; the point 13 ($-B_s$) which represents minus saturation; the point 14 which represents the beginning of the plus saturation region; and the point 15 which represents the beginning of the minus saturation region.

Discussing for the moment the operation of a device utilizing a core which depicts a hysteresis loop such as has been shown in Figure 1, let us initially assume that a coil is wound on the said core. If the core should now initially be at its operating point 10 (plus remanence) and if the core should then be caused to move from the said operating point 10 to its operating point 11 (plus saturation), a relatively small flux change will be effected through the coil and the coil will therefore present a relatively low impedance. If, on the other hand, the core should initially be at its minus remanence operating point 12, and the core is then caused to move from its said operating point 12 to the region of plus saturation, preferably to the operating point 14, a relatively large flux change will be effected through the said coil and the coil will therefore present a relatively high impedance.

These considerations find value in the construction of both series and parallel type magnetic amplifiers. Further, these amplifiers may be of either the complementing or non-complementing type, and in this respect a complementing amplifier is defined as one which will produce an output in the absence of input thereto, or on the other hand, one which will not produce an output when an input is presented thereto. Again, a non-complementing magnetic amplifier is defined as one which will produce an output only when an input has been presented thereto.

In conventional series type magnetic amplifiers, a core carrying a coil thereon is normally provided, and a source of power pulses is coupled to one end of the said coil, the load impedance being coupled to the other end of the said coil. In operation, if the core should be at its plus remanence operating point 10, the application of a power pulse in the +H direction will cause the said core to move from its said +B*r* operating point 10 to plus saturation. Under this state of operation, the coil will present a relatively low impedance and substantially all the energy presented by the said power pulse will pass through the coil to the load impedance in series with the said coil. Such an amplifier may be of the complementing type, in which the core of the amplifier is normally at its plus remanence operating point 10 and a signal input must be applied, ordinarily to a further coil on the core, to cause the said core to be moved from its plus remanence operating point 10 to its minus remanence operating point 12 via the operating point 15, when no output is desired. In such a series type complementing amplifier, the application of a signal input will cause the core to move to its —B*r* operating point 12 immediately prior to the reception of a subsequent positive going power pulse and the said subsequent positive going power pulse in turn flips the core from its —B*r* operating point 12 to its +B*r* operating point 10 in order once more to condition the amplifier to an output producing state. If, on the other hand, the magnetic amplifier is of a non-complementing type, an auxiliary source of reverting current is ordinarily applied to the amplifier whereby the core is caused to be moved to its minus remanence operating point 12 in the time intervals between each positive going power pulse. The said positive going power pulses thus merely cause the core to traverse its high impedance portion, without producing a usable output, in the absence of a signal input opposing the effect of the said reverting current.

In the case of series amplifiers of both the complementing and non-complementing types, therefore, the plus remanence operating point 10 (+B*r*) represents an output-producing point for +H pulses, while the operating point 12 (—B*r*), represents a non-output-producing or an output-inhibiting operating point for +H pulses. In either event, however, known series type magnetic amplifiers have required that the power pulses be of sufficient amplitude to selectively flip the core from its output-inhibiting point 12 to its output-producing point 10 subsequent to the reception of an external signal (in the case of a complementing amplifier), or subsequent to the application of a reverting current (in the case of a non-complementing magnetic amplifier).

In parallel type magnetic amplifiers, much the same considerations are present except that the output-producing point is the —B*r* operating point 12 while the non-output producing or output-inhibiting point for a +H pulse is the +B*r* operating point 10. Thus, in a parallel type amplifier, if the load should be connected in parallel with the coil to which power pulses are applied, no usable output will appear across the said load when the said coil is in a low impedance state, thereby shunting the said load. On the other hand, when the coil is in a high impedance state, substantially all the energy present in the power pulse will be passed through the load in parallel with the said coil rather than through the high impedance coil itself. Similarly, when the load is connected across a coil other than that to which the power pulses are applied, the operation of the said core from its minus remanence operating point 12 to its plus remanence operating point 10 will cause a substantial flux change to occur through the said other coil thereby effecting an output across the load; similarly, the operation of the core from its plus remanence operating point 10 to its plus saturation operating point 11 will cause a relatively small flux change to occur through the said other coil whereby no usable output may be obtained. Again, however, in the parallel type amplifier, it has been the practice to require the power pulses to be of sufficient magnitude to move the core from its output-producing point 12 to its non-output-producing point 10, and back to the said output-producing point 12, under appropriate conditions of operation.

The present invention contemplates the provision of pulse sources so coupled to magnetic amplifiers of both the series and parallel types that this requirement as to power pulse amplitude is no longer necessary. Referring to Figure 2, one form of series magnetic amplifier in accordance with the present invention will be seen. Such an amplifier may comprise a core of magnetic material 20, preferably but not necessarily exhibiting a hysteresis loop of the type shown in Figure 1. The core 20 carries a coil 21 termed a power or output winding thereon; and further carries thereon a coil 22 termed a signal or input winding. One end of the power or output winding 21 is coupled to a source of regularly occurring positive and negative going power pulses applied at a terminal 23, and these power pulses may be of the type shown in Figure 3A. The other end of the said output winding 21 is coupled via a rectifier D1 to an output point 24. A sneak suppressor comprising a diode D2 and a resistor R1, the operation of which will be discussed, is coupled from the said output 24, to ground and to a source of negative potential —V, respectively. One end of the signal or input winding 22 is coupled to an input terminal 25 via a diode D3 and the other end of the said input winding 22 is coupled to a further source of signals termed the "complement-of-the-input" signals, via diode D4. In the particular arrangement illustrated, the complement-of-the-input signals are provided by a source of clock pulses 26 coupled to the lower end of the said input winding 22 via an inhibition gate 27 and the diode D4; the said gate 27 is in turn controlled by input signals appearing at the terminal 25. If we assume that the diodes are ideal and their forward impedance is zero then, the upper and lower ends of the input winding 22 are selectively clamped to ground by rectifiers D5 and D6 and resistors R2 and R3, connected as shown between sources of negative potential —V, ground, and the opposite ends of the winding 22.

It will be noted that the winding directions of the windings 21 and 22 are such that an input signal appearing at the input terminal 25 will cause a current to flow through the coil 22 in a direction producing a flux aiding that effected by power pulses applied to the winding 21. On the other hand, current flowing through the winding 22 due to the application of a complement-of-the-input pulse from the source 26 via the gate 27 and diode D4 will produce a flux in the core 20 in opposition to that produced by power pulses applied to the coil 21. It will further be noted that the particular series type amplifier shown in Figure 2 is of the non-complementing type, in that no output appears at terminal 24 in the absence of an input pulse at terminal 25. The principles of the present invention may, however, be applied with equal force to complementing series type magnetic amplifiers in accordance with the preceding discussion.

Let us now briefly examine the operation of the circuit shown in Figure 2, in light of the waveforms of Figure 3. If we should initially assume that the core 20 is at its minus remanence operating point 12, a positive going power pulse appearing at the terminal 23 during the time interval *t2* to *t3*, for instance, will tend to cause the said core 20 to move from its $-Br$ operating point 12 toward its operating point 14. In accordance with the present invention, the power pulses applied to terminal 23 may be of such amplitude that the core is not caused to flip from its operating point 12 to its operating point 10 via point 14 during the application of such a positive going power pulse. During the next succeeding time period, namely, *t3* to *t4*, a complement-of-the-input pulse is applied from clock pulse source 26 via gate 27 and diode D4 to the lower end of input winding 22. This applied pulse during the time interval *t3* to *t4* raises the lower end of winding 22 above ground potential and causes a current to flow through the said winding 22 to the upper end thereof which is clamped approximately at ground potential by the diode D5 and the resistor R2. This current flow through winding 22, due to the application of a complement-of-the-input pulse during the time interval *t3* to *t4*, produces a flux in opposition to that effected by the power pulse applied to terminal 23 during the interval *t2* to *t3*, and causes the core 20 to be moved back to the region of its minus remanence operating point 12. Complement-of-the-input pulses applied to the lower end of input winding 22 will thus assure that the core 20 remains in a non-output-producing state, and no outputs will be obtained at the terminal 24 during the application of positive going power pulses at the terminal 23.

If now we should further assume that an input pulse is applied to the terminal 25 during a time interval *t5* to *t6*, for instance, this input pulse will be coupled to the inhibition terminal of the gate 27 preventing the application of a complement-of-the-input pulse via the diode D4; and will further be coupled via the diode D3 to the upper end of winding 22, raising the said upper end of winding 22 above ground potential and causing a current to flow through the said winding 22 to the lower end thereof which is clamped approximately at ground potential by resistor R3 and diode D6. The current flow thus effected through the winding 22 by the application of a signal input at terminal 25 produces a magnetomotive force in the core 20 in a direction aiding that applied to the core by the positive going power pulse which had occurred during *t4* to *t5*, and core 20 is thus moved from its minus remanance operating point 12 to its plus remanence operating point 10. The application of the next succeeding positive going power pulse via the terminal 23, during the time interval *t6* to *t7*, will therefore find the coil 21 to present a relatively low impedance whereby substantially all the energy in the said power pulse is caused to pass through the said output coil 21 to the output point 24.

If no further input pulse should appear at the terminal 25 during the time interval *t7* to *t8*, however, a complement-of-the-input pulse will be coupled via the gate 27 and diode D4 to the lower end of winding 22 during the said time interval *t7* to *t8* causing the core 20 to be flipped from its plus remanence operating point 10 to the region of its minus remanence operating point 12, preferably via the point 15, and the amplifier will remain in a non-output-producing state until a further input pulse is received at the terminal 25. Thus, by the arrangement shown, a true non-complementing series magnetic amplifier has been effected which amplifier is not dependent upon the positive-going magnitude of power pulses applied thereto for effecting proper operation thereof.

It should be noted that certain requirements are still present in respect to the power pulses employed. The application of an input-complement pulse via gate 27 produces an input current which flows into rectifier D4 and winding 22, thereby inducing a voltage in output winding 21 which is positive at the anode of output rectifier D1. The power pulses applied to terminal 23 should therefore have negative-going portions of sufficient magnitude to block the rectifier D1 during the application of input-complement pulses to rectifier D4. Thus, if winding 22 has N turns and winding 21 has KN turns, and, further, if the voltage on winding 22 required to flip core 20 is E volts, then the voltage induced in winding 21 will be KE volts and the power pulses must have negative excursions of at least KE volts. The positive excursions of the power pulses applied to terminal 23 may have any value between zero and KE volts, however, inasmuch as the amplifier need no longer rely upon the positive-going amplitude of the power pulses for the flipping of core 20. Under many conditions of operation therefore the power pulses shown in Figure 3A will be asymmetrical in configuration, with negative-going excursions of at least KE volts, and positive-going excursions of less than KE volts.

It should further be noted that, even though the amplifier be in a non-output-producing state, the application of a positive going power pulse will cause the core 20 to move away from its minus remanence ($-Br$) operating point 12, thereby effecting a flux change in the coil 21. This flux change in the coil may in turn cause a small output to appear at the terminal 24 in the absence of suppression thereof, and this small output is normally termed a "sneak" output. By the arrangement of diode D2 and resistor R1, however, such sneak outputs are suppressed, and this suppression is effected by so choosing the value of resistor R1 that a current normally flows from ground through the diode D2 and resistor R1 to the source of negative potential $-V$, which current is equal to or greater than the sneak current to be suppressed. By this arrangement therefore only outputs substantially larger than the sneak output may appear at the terminal 24.

While one particular embodiment of the present invention has been shown in Figure 2, many variations may be effected therein. Thus, it should be noted, for instance, that if pulses are applied simultaneously to rectifiers D3 and D4, there is an effective inhibition of the input applied to one of the said rectifiers by the input applied to the other rectifier. Referring to the circuit of Figure 2, for instance, one may eliminate the gate 27 and the connection between terminal 25 and the said gate 27 and the circuit so modified, as shown in Figure 2*a*, may thus be supplied with pulses at one or the other or both of the rectifiers D3 and D4. If a source of pulses should be applied to the anode of rectifier D3, the circuit will act effectively as a complementer inasmuch as outputs will appear at terminal 24 in the absence of input pulses at the anode of rectifier D4. The application of an input pulse to rectifier D4 will be inhibited in its complementing effect by the input applied from the said source of pulses connected to rectifier D3. By this arrangement therefore a circuit is provided which incorporates the advantages discussed previously and which further acts as a complementer with an inhibition type input.

The principles discussed previously may also be applied to parallel type magnetic amplifiers, and one such amplifier has been shown in Figure 4. Such an amplifier may comprise a core 40, again preferably but not necessarily, exhibiting a hysteresis loop of the type shown in Figure 1. Core 40 may carry plural windings thereon, and these are termed the power winding 41, the signal-inhibiting winding 42, the signal-permitting winding 43 and the output winding 44. A source of regularly occurring positive and negative going power pulses are coupled from a terminal 45 via a rectifier D7 to the upper end of power winding 41, and the lower end of the said winding 41 is grounded as shown. The upper end of signal-inhibiting winding 42 is also grounded, and the lower end of the said winding 42 is coupled via a rectifier D8, poled as shown, to a signal input source 46. The signal input source 46 is further coupled via a further rectifier D9 to the upper end of signal-permitting winding 43 and the lower end of the said winding 43 is coupled to a source of regularly occurring blocking pulses 47 which may be of the type shown in Figure 5B. The upper end of output winding 44 is coupled via a rectifier D10 to an output point 48 whereby an output may appear across a load $R_L$, and the lower end of the said output winding 44 is coupled to a source of blocking pulses 49, of the type shown in Figure 5C. The power pulses applied to the amplifier via terminal 45 (Figure 5A), may be regularly occurring positive and negative going power pulses having a base level of zero. The blocking pulses coupled to the terminals 47 and 49 each comprise positive going pulses occurring in synchronism with the application of positive going power pulses at the terminal 45, and these blocking pulses are utilized respectively to disconnect the input winding from the power pulse and the output winding from the signal pulse, during appropriate time intervals. While the arrangement of Figure 2 has utilized an arrangement wherein both input and input-complement pulses are provided (and it should be noted that these may in fact comprise separate pulse sources synchronized with one another), the arrangement of Figure 4 cooperates with a signal pulse of the type shown in Figure 5D wherein the input signal has two levels, one of which is negative and the other of which is positive.

Examining the operation of Figure 4 in light of the waveforms shown in Figure 5, let us initially assume that the core 40 is at its non-output-producing $+Br$ operating point 10. The application of a positive going power pulse during the time intervals $t2$ to $t3$, and $t4$ to $t5$, for instance, will cause the core 40 to move from its plus remanence operating point 10 to its plus saturation operating point 11, and during each of these time intervals there will be a relatively small flux change through the output coil 44, whereby no usable output will appear across the load resistor $R_L$ at the output terminal 48. The operation is such that during the time interval $t2$ to $t3$, for instance, current will flow from ground through the winding 42 and diode D8 to the terminal 46 which is at a negative potential and this current flow is in a direction producing a flux aiding that produced by the applied power pulse whereby the core will tend to remain at its plus remanence operating point 10 and will tend to be driven toward its plus saturation operating point 11 without there being an output produced.

If during a time interval $t5$ to $t6$ the input signal applied to terminal 46 should go positive, as shown, a current will then tend to flow from the said terminal 46 through diode D9 and winding 43 to the terminal 47, which is then at ground potential, and this current flow through winding 43 during the time interval $t5$ to $t6$ will cause the core 40 to be flipped from its plus remanence operating point 10 to its minus remanence operating point 12. During the application of the next positive going power pulse at terminal 45 during the time interval $t6$ to $t7$, for instance, the core 40 will be moved from its minus remanence operating point 12 toward its operating point 14, thereby causing a substantial flux change to occur through the output coil 44 whereby an appreciable output signal will appear across the load impedance $R_L$ at the output terminal 48.

If no further positive signal should appear at the terminal 46 during the time interval $t7$ to $t8$, the negative signal applied at the said terminal 46 will once more cause a current to flow through signal inhibiting winding 42 thereby producing a magnetomotive force aiding that produced by the power pulse applied to terminal 45 during time interval $t6$ to $t7$, and the core will be caused to move once more to its non-output-producing remanent point 10. Again, therefore, the operation of the parallel amplifier shown in Figure 4 is rendered substantially independent of the power pulse amplitude and the core 40 is caused to move selectively from its output-producing point to its non-output-producing point, and back, primarily under control of the auxiliary signals.

While the amplifier arrangement described in reference to Figure 4 is of the non-complementing type, the principles discussed may be applied to parallel amplifiers of the complementing type. Further, although the arrangement of Figure 2 has employed a plurality of sources of pulses, while the arrangement of Figure 4 has utilized a single pulse source of two distinct potential levels, it must be understood that these forms of the invention are interchangeable and may be utilized in respect to amplifiers of either the series or parallel type and of either the complementing or non-complementing type.

While I have described preferred embodiments of my invention, many variations will readily suggest themselves to those skilled in the art. In particular, the precise amplifiers shown are merely illustrative and the concepts discussed may be applied to other forms of series and parallel magnetic amplifiers in accordance with known principles.

Having thus described my invention, I claim:

1. A magnetic amplifier comprising a core of magnetic material exhibiting hysteresis, first and second windings on said core, a source of spaced power pulses coupled to said first winding and causing flux to be generated successively in said core in a predetermined direction, first signal means selectively coupled to said second winding and causing flux to be selectively generated in said predetermined direction, second signal means selectively coupled to said second winding and causing flux to be selectively generated in a direction opposite to that of said predetermined direction, and control means for determining which of said first and second signal means is coupled to said second winding during time intervals between the coupling of each of said power pulses to said first winding.

2. The magnetic amplifier of claim 1 wherein said source of power pulses is coupled to one end of said first winding, a load impedance coupled to the other end of said first winding, said first and second signal means being coupled to opposite ends of said second winding, said first and second signal means generating signals of the same polarity.

3. The amplifier of claim 2 including clamp means coupled to each end of said second winding for holding one or the other end of said second winding at a predetermined potential in the absence of a signal applied thereto.

4. The magnetic amplifier of claim 1 wherein said first and second signal means include means generating signals of opposite polarities respectively.

5. The magnetic amplifier of claim 4 wherein said second winding comprises two distinct winding portions, first rectifier means coupling signals of one of said polarities to one of said distinct winding portions, and second rectifier means coupling signals of the other of said polarities to the other of said distinct winding portions.

6. The magnetic amplifier of claim 1 including a third winding on said core, and a load impedance coupled to said third winding.

7. The magnetic amplifier of claim 1 wherein said core comprises a magnetic material exhibiting a substantially rectangular hysteresis loop.

8. A magnetic amplifier comprising a core of magnetic material, first and second windings on said core, a source of power pulses coupled to said first winding, said power pulses being of insufficient amplitude to cause said core of magnetic material to traverse its hysteresis loop from one of its remanent points to the other of its remanent points, and a source of first and second signals coupled to the said second winding, said first and second signals being of such polarity with respect to one another and with respect to said second winding that they respectively cause flux to be generated in opposing directions in said magnetic core, whereby one only of said first and second signals effects a flux in said core in a direction aiding the flux produced by current passing through said first winding due to said power pulses.

9. The magnetic amplifier of claim 8 including a load impedance in series with said first winding.

10. The magnetic amplifier of claim 8 including a load impedance in parallel with said first winding.

11. The amplifier of claim 8 wherein said source of first and second signals generates signals of the same polarity, said first and second signals being coupled respectively to opposite ends of said second winding.

12. The amplifier of claim 8 wherein said source of first and second signals generates signals of opposite polarities respectively, said first and second signals being coupled effectively to the same end of said second winding.

13. The amplifier of claim 8 wherein said second winding comprises two distinct winding portions respectively wound in opposite directions on said core, said first and second signals being coupled respectively to said two winding portions.

14. The amplifier of claim 13 wherein said first and second signals are of opposite polarities respectively, first and second rectifier means coupled between said source of first and second signals and said second winding, said first and second rectifiers being oppositely poled with respect to said source of first and second signals.

15. A magnetic amplifier comprising a magnetic core exhibiting positive and negative remanence points, first means successively producing a first magnetomotive force in said core in a predetermined direction, said first magnetomotive force being of insufficient magnitude to cause said core to move from one of its remanence points to the other of said remanence points, second means producing a second magnetomotive force in said core in a direction aiding said first magnetomotive force, and third means producing a third magnetomotive force in said core in a direction opposing said second magnetomotive force, means rendering, said second and third means selectively operative upon said core between successive productions of said first magnetomotive force whereby said core is caused to move selectively between its positive and negative remanence points during time intervals between the successive productions of said first magnetomotive force.

16. The magnetic amplifier of claim 15 wherein said core comprises a magnetic material exhibiting a substantially rectangular hysteresis loop.

17. In a magnetic amplifier, a core of magnetic material having a power winding and a control winding thereon, a source of spaced power pulses coupled to said power winding for regularly effecting current flow in said power winding thereby to effect a first magnetomotive force in said core, a first source of control pulses coupled to one end of said control winding for selectively effecting current flow in said control winding thereby to effect a second magnetomotive force in said core in a direction aiding said first magnetomotive force, a second source of control pulses coupled to the other end of said control winding for selectively opposing the said first source of control pulses, and control means for operatively coupling a selected one of said first and second control pulse sources to said control winding during time intervals intermediate the occurrence of said spaced power pulses.

18. The combination of claim 17 wherein said control means includes a gating device interposed between said second source of control pulses and said other end of said control winding, and means responsive to occurrence of pulses from said first source of control pulses for inhibiting passage of pulses from said second source through said gating device.

19. The combination of claim 17 wherein one of said control pulse sources comprises means producing regularly occurring clock pulses, the other of said control pulse sources including means intermittently producing pulses in coincidence with selected ones of said clock pulses.

20. In a magnetic amplifier, a core of magnetic material having first and second winding means thereon, a source of first regularly occurring spaced pulses coupled to said first winding means for regularly producing a first magnetomotive force in said core of insufficient magnitude to cause said core to traverse its hysteresis loop between two preselected operating points thereof, a source of second pulses coupled to said second winding means for producing an auxiliary magnetomotive force in said core in a direction aiding said first magnetomotive force, whereby joint operation of said first and second pulses causes said core to traverse its hysteresis loop between said two preselected operating points, and a source of third pulses coupled to said second winding means for opposing the said auxiliary magnetomotive force effected by said second pulses.

References Cited in the file of this patent

UNITED STATES PATENTS

| | | |
|---|---|---|
| 2,709,798 | Steagall | May 31, 1955 |
| 2,710,952 | Steagall | June 14, 1955 |